United States Patent [19]

Yates et al.

[11] Patent Number: 4,726,934
[45] Date of Patent: Feb. 23, 1988

[54] CARBON BLACK BURNER

[75] Inventors: Barrie J. Yates, Roswell, Ga.; Alan J. Austin, Chester; David J. Hammonds, South Wirral, both of United Kingdom

[73] Assignee: Cabot Corporation, Boston, Mass.

[21] Appl. No.: 781,277

[22] Filed: Sep. 27, 1985

Related U.S. Application Data

[63] Continuation of Ser. No. 516,914, Jul. 25, 1983, abandoned.

[30] Foreign Application Priority Data

Oct. 27, 1982 [GB] United Kingdom ............... 8230640

[51] Int. Cl.⁴ ............................................. C09C 1/48
[52] U.S. Cl. ................................. 422/150; 422/156; 239/434
[58] Field of Search .............. 422/150, 151, 156, 157, 422/158; 423/459; 239/434

[56] References Cited

U.S. PATENT DOCUMENTS

| | | | |
|---|---|---|---|
| 1,593,497 | 7/1926 | Kerr | 239/434 |
| 1,785,802 | 12/1930 | Adams | 239/434 |
| 1,826,776 | 10/1931 | Gunther | 239/434 |
| 1,975,067 | 9/1934 | Colclasure | 239/434 |
| 2,413,586 | 12/1946 | Skoog | 422/158 |
| 2,532,851 | 12/1950 | Meyer | 239/434 |
| 2,635,946 | 4/1953 | Weber | 422/158 |
| 2,812,212 | 11/1957 | Rogers | 239/434 |
| 3,009,787 | 11/1961 | Ruble | 422/150 |
| 3,046,096 | 7/1962 | Heller | 422/150 |
| 3,203,767 | 8/1965 | Middlebrooks | 422/158 |
| 3,240,254 | 3/1966 | Hughes | 239/434 |
| 3,318,664 | 5/1967 | Latham | 422/151 |
| 3,353,915 | 11/1967 | Latham | 422/150 |
| 3,443,761 | 5/1969 | Groot | 422/150 |
| 3,567,395 | 3/1971 | Henderson | 422/157 |
| 3,755,543 | 8/1973 | Latham | 422/150 |
| 3,867,092 | 2/1975 | Sage | 239/434 |
| 4,228,131 | 10/1980 | Rothbuhr | 422/158 |
| 4,328,199 | 5/1982 | Cheng | 423/450 |
| 4,394,350 | 7/1983 | Cheng | 422/156 |
| 4,439,401 | 3/1984 | Voll | 422/150 |

FOREIGN PATENT DOCUMENTS

| | | | |
|---|---|---|---|
| 292137 | 11/1928 | United Kingdom | 239/434 |
| 1253875 | 11/1971 | United Kingdom | 239/434 |

*Primary Examiner*—Ernest G. Therkorn
*Attorney, Agent, or Firm*—Robert J. Feltovic

[57] ABSTRACT

An improved carbon black burner for producing a carbon black with reduced grit content wherein feedstock oil is introduced radially into an atomizing fluid conduit through ports located proximate the discharge orifice of the burner.

6 Claims, 1 Drawing Figure

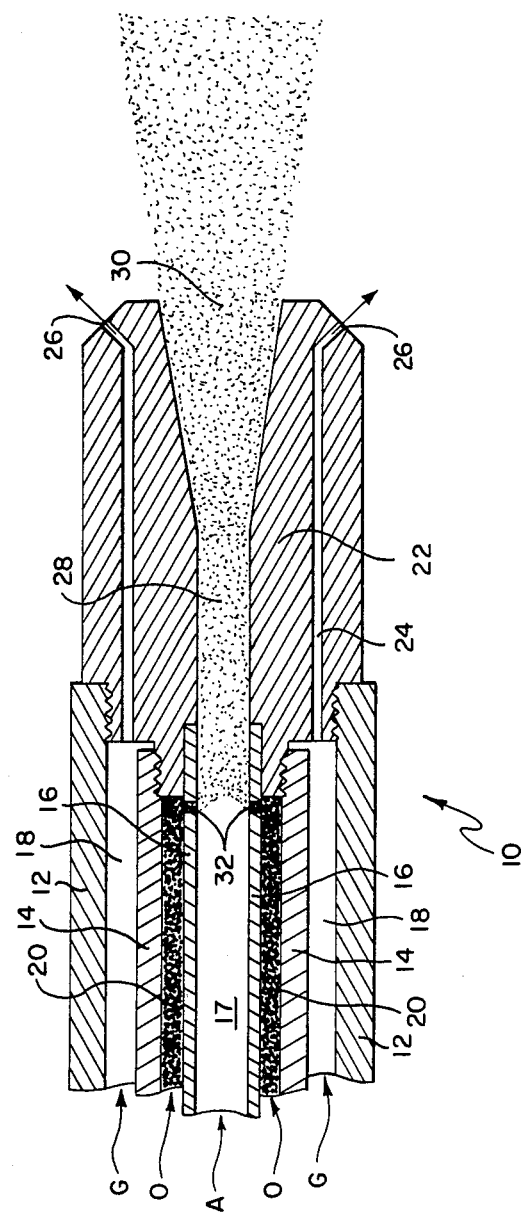

CARBON BLACK BURNER

This application is a continuation of application Ser. No. 516,914 filed July 25, 1983, now abandoned.

Carbon blacks can be produced by various processes, the most common of which are the lampblack process, the channel process, the gas furnace process, the oil furnace process, the thermal process, and the acetylene black process. In the oil furnace process, the most economical and most widely practiced of the common processes, a hydrocarbon fuel is burned with an oxidant, such as air, in a closed chamber, usually refractory-lined, and a feedstock oil is injected into the resulting combustion gases. The carbon black industry employs a wide variety of systems for mixing and introducing the feedstock oil, oxidant, and combustion fuel into an oil furnace reactor and has developed various reactor geometries in an effort to attain desired combinations of properties in the final product. An essential part of an oil furnace black system is that all the feedstock oil introduced be "atomized" into very small droplets, so that it can be rapidly vaporized before undergoing carbon black formation. Any oil that undergoes reaction as a liquid before being vaporized tends to form undesirable grit particles in the carbon black product. Atomization generally is accomplished by mixing the feedstock oil with a stream of pressurized fluid, such as air, or by ejecting the oil under high pressure through atomizing nozzles. Characteristics such as the size, concentration, or spray pattern of the droplets influences oil vaporization efficiency which may in turn affect the carbon black product.

Now, according to the present invention, an oil furnace process carbon black burner is provided which is useful in reducing grit content of a carbon black product, where such is a problem.

There exists no comprehensive theory specifically categorizing the effects of implementing various structural modifications in carbon black burner assemblies. In particular, there is a lack of consensus in regard to the manner in which such burner structural modifications may influence the properties of the carbon black produced thereby. However, it has been found that the burner construction, according to the present invention, is particularly advantageous in reducing the grit content of a carbon black produced in oil furnace processes where feedstock oil is atomized prior to injection into a combustion gas stream.

The subject invention is a burner assembly having an internal atomization arrangement for producing an atomized stream of feedstock oil that is discharged through an orifice into a combustion gas flame. The oil discharge orifice typically is surrounded by a plurality of ports that emit fuel gas which combines with oxidant air to form a shroud of hot combustion gases that engulf the oil spray as it is injected into the reactor chamber. In order to provide an effectively atomized spray of feedstock oil that is efficiently vaporized and produces a low grit content carbon black, at least one feedstock oil outlet is positioned to inject feedstock oil radially into an atomizing fluid passage at a point in the burner assembly proximate to the end of the atomizing fluid passage communicating with the discharge orifice opening into the reactor chamber. Using such an arrangement, the feedstock oil is atomized by injecting it radially into a stream of atomizing fluid flowing through a conduit whereby said feedstock is dispersed into small droplets which are discharged as a fine spray through a discharge orifice into the reactor for vaporization and carbon black formation. Preferably, a plurality of feedstock oil outlets are positioned to inject the feedstock oil radially into the atomizing fluid passage.

The invention will be better understood by reference to the accompanying drawing which depicts a cross-sectional view of a discharge end of a preferred embodiment of the burner of the present invention.

Carbon black burner 10 generally comprises three main concentric conduits disposed respectively within each other: outer barrel 12, oil pipe 14, and atomizing fluid conduit 16. The inner and outer surfaces of oil pipe 14 and atomizing fluid conduit 16 are positioned within the burner barrel 12 with clearances so as to form annular passages 18 and 20. The concentric conduits co-terminate at a burner discharge tip 22. The ends of burner barrel 12 and oil pipe 14 are tapped to receive the threaded ends of discharge tip 22. Formed in discharge tip 22 is annular passage 24 which communicates with annular passage 18 and leads to a plurality of discharge ports 26 which lie in a common plane normal to the axis of the burner assembly and are equally circumferentially spaced around the discharge tip. Set in the center of the discharge tip 22 is an exit passage 28 communicating with fluid passage 17 and leading to discharge orifice 30. The walls of atomizing fluid conduit 16 include a plurality of oil outlet passages 32 which communicate with annular passage 20 and open into the fluid passage 17 proximate to its end communicating with passage 28. Outlets 32 are spaced equidistantly in a common plane about the periphery of conduit 16.

In the operation of burner 10, a fuel gas, designated by the arrow G, is introduced at a port at the remote end (not shown) of the burner assembly and flows down annular passage 18, the space defined by the outer wall of oil pipe 14 and the inner wall of the burner barrel 12. At the nozzle end 22 of the burner, the gas enters passage 24 and exits into the furnace (not shown) through the plurality of discharge ports 26 circumferentially spaced about the nozzle tip.

Feedstock oil, designated by the arrow O, is introduced into the burner 10 through a port at the remote end (not shown) of the burner assembly and flows down annular passage 20, the space defined by the outer wall of atomizing fluid conduit 16 and the inner wall of oil pipe 14. At the discharge end 22 of the burner, the feedstock oil enters outlet passages 32 which are spaced equidistantly about the periphery of atomizing fluid conduit 16 and lead to fluid passage 17. Outlets 32 are positioned to inject the feedstock oil radially into fluid passage 17.

Atomizing fluid, such as pressurized air, designated by the arrow A, is introduced into the burner 10 through a port at the remote end (not shown) of the burner assembly and flows down passage 17 which communicates with passage 28 at the discharge end 22 of the burner. As the atomizing fluid flows through conduit 16, it serves to atomize the feedstock oil stream being injected into the fluid passage through outlets 32. The oil droplets are briefly mixed with the atomizing fluid and are swept through passage 28 to discharge orifice 30. The atomized oil stream exits as a spray through discharge orifice 30 into the furnace (not shown). The feedstock oil is engulfed by the combustion gas flame to react and result in the formation of carbon black in accordance with conventional and known techniques.

The drawing illustrates a preferred embodiment of the invention in which the exit passage diverges to discharge orifice 30 before opening out to the discharge end. Six oil outlets 32 are shown located equidistantly around the passage of the atomizing fluid conduit at a point just prior to the discharge end. A diverging section prior to the discharge orifice is not required; the atomizing fluid conduit can lead directly to the discharge orifice, or combinations of straight, converging, and diverging sections can be used.

A preferred embodiment, as shown in the drawings, is an arrangement wherein the oil feedstock is injected radially inwardly into an atomizing fluid stream from a plurality of outlets spaced equidistantly about the periphery of an atomizing fluid conduit. However, the radial feedstock introduction also can be accomplished by alternative arrangements. The feedstock oil injection outlets need not be equidistantly spaced from each other about the periphery of the atomizing fluid conduit nor must they be positioned equidistantly from the discharge orifice. Moreover, the radial injection of the oil into the atomizing stream may be radially outwardly from the center of the atomizing fluid conduit. Radial outward introduction readily could be accomplished by having a feedstock oil conduit disposed concentrically within an atomizing fluid conduit. Outlet passages could be set about the periphery of the oil conduit to inject feedstock oil radially outwardly into the annular atomizing fluid passage surrounding the oil conduit.

The following testing procedures are used in evaluating the analytical and physical properties of the black pellets produced by the present invention.

IODINE ADSORPTION NUMBER

The iodine adsorption number of a carbon black is determined in accordance with ASTM Test Method D-1510-70.

SPECTRONIC 20

This method is a procedure for determining the degree of discoloration of toluene by carbon black by means of a spectrophotometer. The percent transmission is determined in accordance with ASTM Test Method D-1618.

DIBUTYL PHTHALATE (DBP) ABSORPTION NUMBER

The DBP absorption number of a carbon black is determined in accordance with ASTM Test Method D-2414-76.

TINT STRENGTH

The tint strength of a carbon black sample is determined relative to an industry reference black in accordance with ASTM Test Method D-3265-76a.

GRIT CONTENT

The grit content of a sample is determined by preparing a water dispersion of the subject black and passing it through a desired standard screen. The 45 grit reported is determined by the water sieve residue using a 325 mesh screen, according to ASTM Test Method D-1514-60.

The following tables list typical operating conditions for a burner assembly according to the present invention. In the example runs described, the subject burner is utilized in conjunction with suitable reaction apparatus which generally comprises a cylindrical, refractory-lined reactor. The burner is axially positioned at one end of the reactor with its tip set to introduce a spray of atomized feedstock into a reaction chamber having an inner diameter of 3 ft. (0.91 m). The burner tip is positioned within an axially located 15 in. (38.1 cm) diameter, 4.5 in. (11.4 cm) long entry passage which diverges to the diameter of the reaction chamber. Combustion air is introduced into the reaction chamber through the annular passage formed by the burner within the entry passage. At a point 8 ft. 9 in. (2.67 m) downstream, the reaction chamber converges to a diameter of 2 ft. 3 in. (0.68 m) and water quench spray nozzles are located in the reactor passage 25 ft. (7.62 m) downstream from the point where feedstock oil enters the reaction chamber, in order to terminate the reaction. The formed carbon black is cooled and then passes into suitable collection apparatus. The fluffy black often is further processed in a pelletizing apparatus where free-flowing pellets are formed.

Conditions readily could be varied by one skilled in the art of carbon black manufacture in order to modify the resulting product so as to produce the particular grade of carbon black desired. The specific design and dimensions of the burner and/or the reactor also may dictate modifications in the operating conditions employed.

TABLE A

| Run | 1 |
| --- | --- |
| Burner | |
| Oil Outlets (no. × diameter) | 6 × 3.3 mm |
| Atomizing Fluid Passage (diameter) | 0.625 in. (1.588 cm) |
| Fuel Gas Discharge Ports (no. × diameter × position) | 6 × 4 mm @ 45° |
| Quench Position | 25 ft. (7.6 m) (downstream from burner tip) |
| Operating Conditions | |
| Combustion Air | |
| Rate | 109000 scfh (0.857 m$^3$/sec) |
| Temperature | 675° F. (375° C.) |
| Atomizing Air | |
| Rate | 3500 scfh (0.028 m$^3$/sec) |
| Pressure | 40 psig (0.276 M Pa) |
| Fuel Gas | |
| Rate | 10740 scfh (0.003 m$^3$/sec) |
| Pressure | 120 psig (0.827 M Pa) |
| Feedstock Oil | |
| Rate | 248 gph (0.003 m$^3$/sec) |
| Pressure | 65 psig (0.448 M Pa) |
| Temperature | 300° F. (149° C.) |
| K$^+$ (gms/100 U.S.g) | 24 (63.4 gms/m$^3$) |
| Quench Temperature | 1430° F. (777° C.) |
| Carbon Black Properties | |
| Fluffy Black | |
| Iodine Number | 29 mg/g |
| Spectronic 20 | 59% transmission |
| DBP Absorption | 64 cc/100 g |
| Pelleted Black | |
| Iodine Number | 30 mg/g |
| Spectronic 20 | 88% transmission |
| DBP Absorption | 62 cc/100 g |
| Tinting Strength | 56% |
| 45 micron GRIT | |
| Total | 0.0074 wt % |
| Magnetic | 0.0017 wt % |

Another set of runs was conducted employing the conditions listed in Table B, below. The testing procedures used to evaluate the analytical properties of the black pellets produced through use of the present invention were the same as those described above. The analytical properties are listed in Table C, below.

TABLE B

| Run | 2 | 3 | 4 |
|---|---|---|---|
| Burner | | | |
| Oil Outlets (no. × dia.) | 6 × 3 mm | 6 × 3 mm | 6 × 3 mm |
| Atomizing Air Passage (dia.) | 12.5 mm | 12.5 mm | 12.5 mm |
| Fuel Gas Discharge Ports | 6 × 3 mm @ 45° | 6 × 3 mm @ 45° | 6 × 3 mm @ 45° |
| Quench Position (from burner tip) | 25 ft. (7.6 m) | 25 ft. (7.6 m) | 25 ft. (7.6 m) |
| Operating Conditions | | | |
| Total Combustion Air | | | |
| Rate, scfh (m$^3$/sec.) | 120800 (0.950) | 118800 (0.934) | 118800 (0.934) |
| Temperature, °F. (°C.) | 615 (324) | 625 (329) | 695 (368) |
| Atomizing Air | | | |
| Rate, scfh (m$^3$/sec.) | 4050 (0.032) | 4140 (0.033) | 3680 (0.029) |
| Pressure, psig (M Pa) | 72 (0.496) | 75 (0.517) | 65 (0.448) |
| Fuel Gas | | | |
| Rate, scfh (m$^3$/sec.) | 12210 (0.096) | 11630 (0.091) | 12210 (0.096) |
| Pressure, psig (M Pa) | 150 (1.034) | 140 (0.965) | 150 (1.034) |
| Feedstock Oil | | | |
| Rate, gph (m$^3$/sec.) | 269 (0.003) | 277 (0.003) | 286 (0.003) |
| Pressure, psig (M Pa) | 100 (0.690) | 105 (0.724) | 105 (0.724) |
| Temperature, °F. (°C.) | 300 (149) | 300 (149) | 300 (149) |
| K+, gms/100 U.S.g (gms/m$^3$) | 23 (60.8) | 43 (113.6) | 75 (198.2) |
| Quench Temperature, °F.(°C.) | 1420 (771) | 1405 (763) | 1425 (774) |

TABLE C

| Run | 2 | 3 | 4 |
|---|---|---|---|
| Carbon Black Properties | | | |
| Fluffy Black | | | |
| Iodine Number (mg/g) | 28 | 28 | 28 |
| Spectronic 20 (% transmission) | 36 | 24 | 25 |
| DBP Absorption (cc/100 g) | 65 | 62 | 65 |
| Pelleted Black | | | |
| Iodine Number (mg/g) | 29 | 29 | 29 |
| Spectronic 20 (% transmission) | 66 | 59 | 58 |
| DBP Absorption (cc/100 g) | 63 | 63 | 61 |
| Tinting Strength (%) | 4 | 58 | — |
| 45 micron Grit | | | |
| Total | 0.0128 | 0.0056 | 0.0136 |
| Magnetic | 0.0056 | 0.0029 | 0.0026 |

The above data represents a series of runs conducted to demonstrate the production of SRF grade carbon black. In addition to meeting the specifications for an SRF black, favorably low grit levels also were achieved.

The oil feedstocks used in Runs 1–4 were blends of three separate feedstocks whose typical compositions and properties are listed below. Run 1 used a blend of 95% feedstock II and 5% feedstock III; Run 2 used a blend of 75% feedstock I and 25% feedstock II; Runs 3 used a blend of 50% feedstock I and 50% feedstock II; Run 4 used 100% feedstock II.

| Feedstock I | |
|---|---|
| Hydrogen (%) | 8.5 |
| Carbon (%) | 91.5 |
| Hydrogen/Carbon Atom Ratio | 1.11 |
| Sulfur (%) | 0.04 |
| Asphaltenes (%) | 6 |
| API Grav. @ 15.6° C. (60° F.) | +1.5 |
| Spec. Grav. @ 15.6° C. (60° F.) | 1.052 |
| SAYBOLT UNIVERSAL VISCOSITY | |
| 54.4° C. (130° F.) | 250 |
| 98.9° C. (210° F.) | 62 |
| Sediment (%) | 0.06 |
| Ash (%) | 0.002 |
| Sodium (ppm) | 2 |
| Potassium (ppm) | 0.2 |
| I.B.P., °C. | 204 |
| 50% B.P., °C. | 370 |
| BMCI (Visc./Grav.) | 117 |
| BMCI (50% B.P./Grav.) | 134 |
| Aromatics (%) | 90 |
| Saturates (%) | 10 |
| AROMATIC RING DISTRIBUTION (% of Aromatics) | |
| 1-Ring (%) | 25 |
| 2-Ring (%) | 50 |
| 3-Ring (%) | 12 |
| 4-Ring (%) | 8 |
| 5-Ring (%) and higher | 5 |
| Carbon Residue, Ramsbottom (%) | 8 |
| Lbs. C/U.S. Gallon (kg/m$^3$) | 8.11 (971.6) |
| Carbon Residue, TGA (%) | 2.9 |

| Feedstock II | |
|---|---|
| Hydrogen (%) | 7.6 |
| Carbon (%) | 92.3 |
| Hydrogen/Carbon Atom Ratio | 0.98 |
| Sulfur (%) | 0.06 |
| Asphaltenes (%) | 3 |
| API Grav. @ 15.6° C. (60° F.) | +6 |
| Spec. Grav. @ 15.6° C. (60° F.) | 1.029 |
| SAYBOLT UNIVERSAL VISCOSITY | |
| 54.4° C. (130° F.) | 40 |
| 98.9° C. (210° F.) | 32 |
| Sediment (%) | 0.02 |
| Ash (%) | 0.002 |
| Sodium (ppm) | 2 |
| Potassium (ppm) | 0.1 |
| I.B.P., °C. | 204 |
| 50% B.P., °C. | NA |
| BMCI (Visc./Grav.) | 115 |
| BMCI (50% B.P./Grav. | NA |
| Aromatics (%) | 99 |
| Saturates (%) | 1 |
| AROMATIC RING DISTRIBUTION (% of Aromatics) | |
| 1-Ring (%) | 12 |
| 2-Ring (%) | 55 |
| 3-Ring (%) | 14 |
| 4-Ring (%) | 15 |
| 5-Ring (%) and higher | 4 |
| Carbon Residue, Ramsbottom (%) | 6 |
| Lbs. C/U.S. Gallon (kg/m$^3$) | 7.91 (947.7) |
| Carbon Residue, TGA (%) | — |

| Feedstock III | |
|---|---|
| Hydrogen (%) | 7.3 |
| Carbon (%) | 92.4 |
| Hydrogen/Carbon Atom Ratio | 0.94 |
| Sulfur (%) | 0.2 |
| Asphaltenes (%) | 14 |
| API Grav. @ 15.6° C. (60° F.) | +0.8 |
| Spec. Grav. @ 15.6° C. (60° F.) | 1.070 |
| SAYBOUT UNIVERSAL VISCOSITY | |
| 54.4° C. (130° F.) | 110 |
| 98.9° C. (210° F.) | 44 |
| Sediment (%) | 0.008 |
| Ash (%) | 0.002 |
| Sodium (ppm) | 2 |
| Potassium (ppm) | 0.2 |
| I.B.P , °C. | 210 |
| 50% B.P., °C. | 280 |
| BMCI (Visc./Grav.) | 123 |
| BMCI (50% B.P./Grav.) | 116 |
| Aromatics (%) | 99 |
| Saturates (%) | 1 |
| AROMATIC RING DISTRIBUTION (% of Aromatics) | |
| 1-Ring (%) | 12 |
| 2-Ring (%) | 56 |
| 3-Ring (%) | 12 |
| 4-Ring (%) | 15 |
| 5-Ring (%) and higher | 5 |
| Carbon Residue, Ramsbottom (%) | 12 |
| Lbs. C/U.S. Gallon (Kg/m$^3$) | 8.23 (986.0) |

The fuel gas used in all of the examples was natural gas having the following composition and heating value:

Methane: 92.3%
Ethane: 3.6%
Propane: 0.9%
Butane: 0.2%
Nitrogen: 2.8%
Carbon Dioxide: 0.2%
Gross CV (J/m$^3$): 1060 Btu/scf (31648)
Net CV (J/m$^3$): 957 But/scf (28573)

The burner of the present invention has proven to be particularly advantageous in the production of low grit, semi-reinforcing furnace carbon blacks (SRF). However, by modifying reactant flow rates, reactor conditions, and the like, carbon blacks of various structures could be produced. Certain modifications may also be made in details of the above description of the invention without departing from the spirit and scope of the invention defined in the appended claims. Accordingly, it is intended that all matter contained in the above description or shown in the accompanying drawing and examples be interpreted as illustrative and not limiting in nature.

The embodiments of the invention in which an exclusive property or privilege is claimed are defined as follows:

1. In a carbon black burner assembly having an internal atomization arrangement for producing an atomized stream of feedstock oil that is discharged through an orifice into a combustion gas flame, an improved feedstock oil atomization arrangement comprising three concentric conduits that coterminate at a burner discharge tip and including at least one feedstock oil outlet positioned to inject feedstock oil radially into an atomizing fluid passage, wherein said oil outlet is located proximate to the end of the atomizing fluid passage communicating with the discharge orifice, so as to form an effectively atomized fine spray of feedstock oil emitted from said discharge orifice, said discharge orifice surrounded by a plurality of fuel emitting ports which act to form a shroud of combustion that engulfs the atomized stream of feedstock oil as it is discharged from the orifice said fuel emitting ports communicating with an annular passage formed by said concentric conduits through an annular passage in said burner tip, whereby a carbon black product with a reduced grit content is produced.

2. The carbon black burner assembly of claim 1 comprising at least one feedstock oil outlet positioned to inject feedstock oil radially inwardly into an atomizing fluid passage.

3. The carbon black burner assembly of claim 1 comprising at least one feedstock oil outlet positioned to inject feedstock oil radially outwardly into an atomizing fluid passage.

4. The carbon black burner assembly of claim 1 comprising a plurality of feedstock oil outlets positioned to inject feedstock oil radially into an atomizing fluid passage.

5. The carbon black burner assembly of claim 1 comprising a plurality of feedstock oil outlets positioned around the periphery of an atomizing fluid passage communicating with a discharge orifice wherein said oil outlets are located proximate to the end of the atomizing fluid passage communicating with the discharge orifice and are positioned so as to inject the oil radially inwardly into the atomizing fluid passage.

6. The carbon black burner of claim 5 wherein there are six feedstock oil outlets positioned equidistantly around the periphery of the atomizing fluid passage.

* * * * *